No. 799,484. PATENTED SEPT. 12, 1905.
W. A. MITCHELL.
FERTILIZER DISTRIBUTER.
APPLICATION FILED JUNE 29, 1905.
2 SHEETS—SHEET 1.
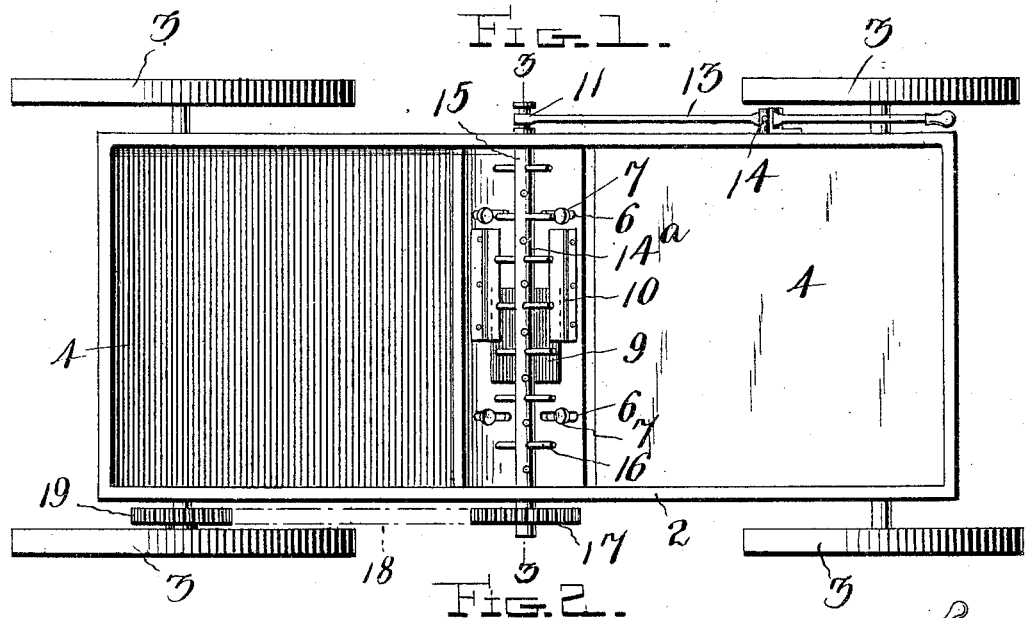
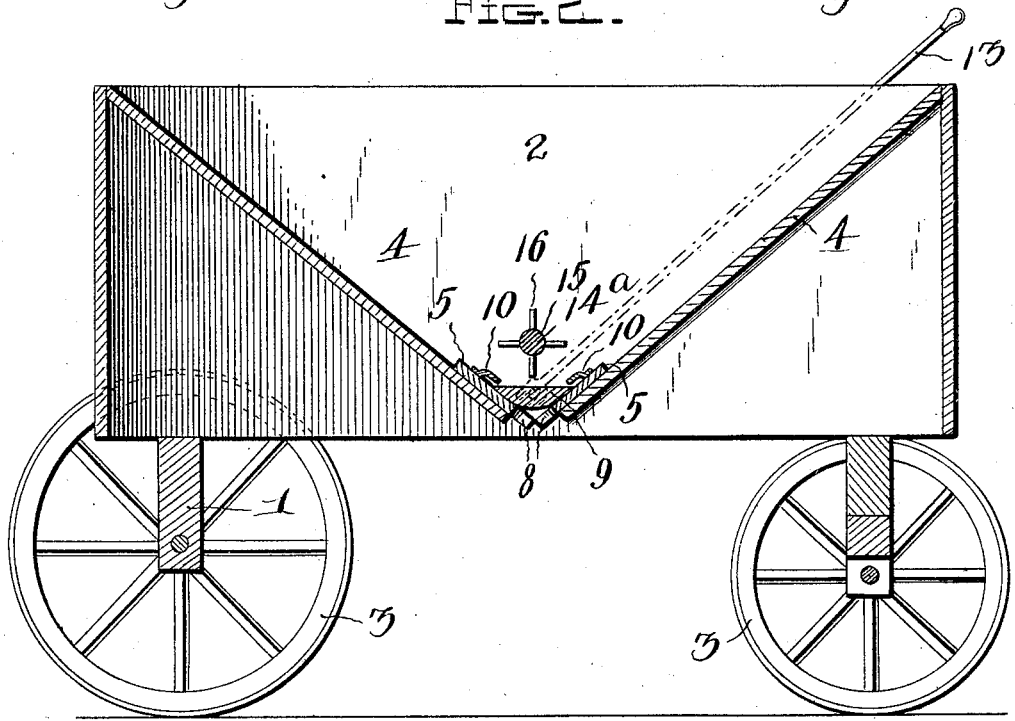
Witnesses
Jas A Koehl.
C. H. Griesbauer
Inventor
William A. Mitchell.
by H. B. Willson
Attorney No. 799,484. PATENTED SEPT. 12, 1905.
W. A. MITCHELL.
FERTILIZER DISTRIBUTER.
APPLICATION FILED JUNE 29, 1905.

2 SHEETS—SHEET 2.

Witnesses
Jas. A. Kaehl.
C. H. Griesbauer.

Inventor
William A. Mitchell.
by H. R. Wilson
Attorney

UNITED STATES PATENT OFFICE.

WILLIAM ALISON MITCHELL, OF TIFTON, GEORGIA.

FERTILIZER-DISTRIBUTER.

No. 799,484.  Specification of Letters Patent.  Patented Sept. 12, 1905.

Application filed June 29, 1905. Serial No. 267,608.

*To all whom it may concern:*

Be it known that I, WILLIAM ALISON MITCHELL, a citizen of the United States, residing at Tifton, in the county of Berrien and State of Georgia, have invented certain new and useful Improvements in Fertilizer-Distributers; and I do declare the following to be a full, clear, and exact description of the invention, such as will enable others skilled in the art to which it appertains to make and use the same.

My invention relates to improvements in fertilizer-distributers; and it consists in the novel construction, combination, and arrangement of parts, as will be hereinafter described and claimed.

The object of the invention is to provide a simple and efficient means which may be applied to wagons of ordinary construction, so as to adapt them for distributing manure or other fertilizer either in rows or broadcast, as desired.

The above and other objects, which will appear as the nature of my invention is better understood, are accomplished by means of the construction illustrated in the accompanying drawings, in which—

Figure 3:
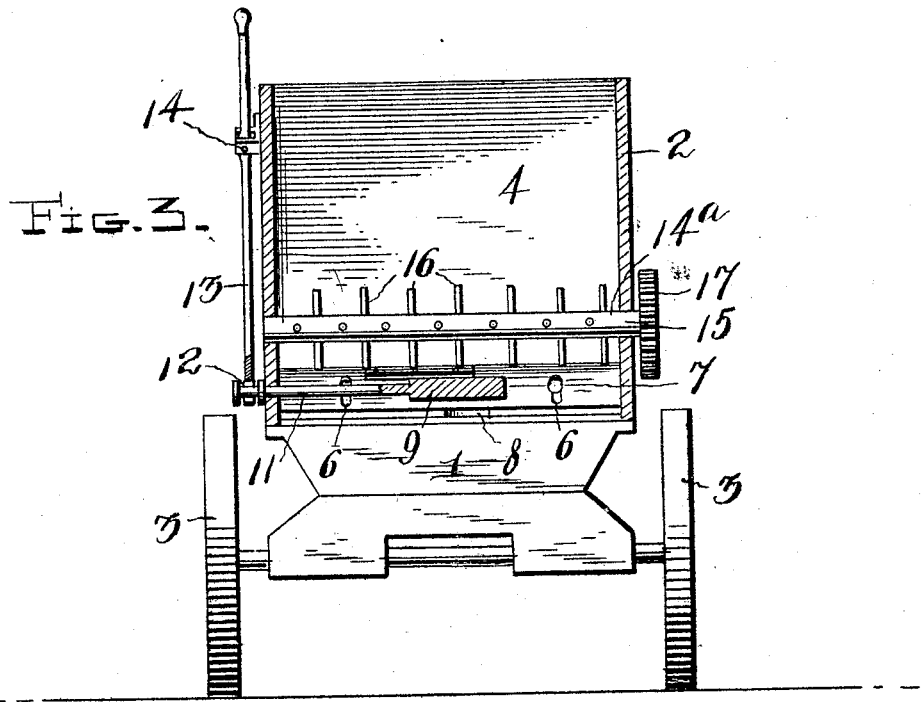
Figure 4:
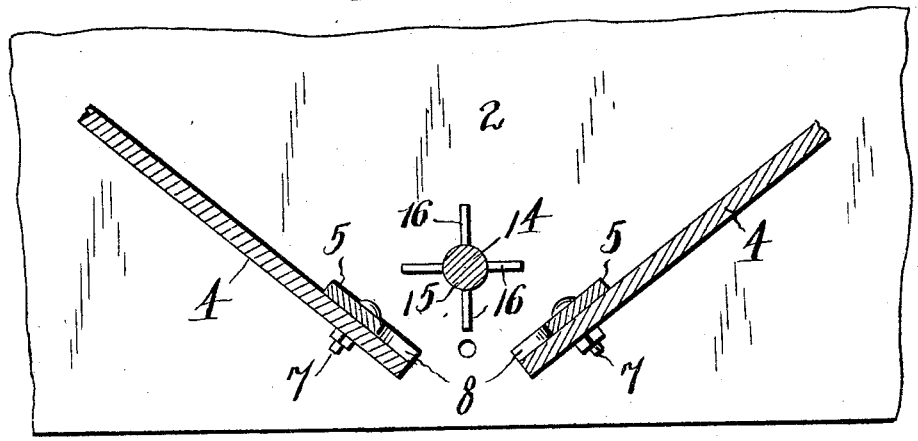

Figure 1 is a top plan view of a fertilizer-distributer constructed in accordance with my invention. Fig. 2 is a vertical longitudinal sectional view through the same. Fig. 3 is a vertical transverse sectional view taken on the line 3 3 in Fig. 1, and Fig. 4 is a detail view showing the machine adapted for distributing the manure or fertilizer broadcast.

Referring to the drawings by numeral, 1 denotes the frame or running-gear of a wagon upon which is mounted a body 2 and which is supported by front and rear wheels 3, as shown. The body 2, which forms a hopper to receive the manure or other fertilizer to be distributed, has its bottom constructed of two oppositely and downwardly inclined sections 4, which have their lower adjacent ends spaced apart, as seen in Fig. 2 of the drawings. The space between said sections 4 is adapted to be varied by two adjustable plates 5, which extend transversely across the upper faces of said sections at their lower ends and which are adjustably mounted, preferably, by forming them with slots 6 to receive bolts 7, which also pass through the sections 4. By adjusting said plates toward and from each other the space between them may be varied to control the amount of manure distributed broadcast. When the machine is to be used for distributing the fertilizer in rows, the plates 5 are adjusted so that their adjacent edges contact, and the only outlets for the fertilizer will be through alining notches or recesses 8, formed in said edges of the plates, as shown in the drawings. Any desired number of said recesses or notches 8 may be provided, so that the fertilizer may be distributed in any number of rows; but, as illustrated in the drawings, I have shown but one pair of alining notches, which are controlled by a valve 9. The latter is in the form of a rectangular plate which is slidably mounted between guides 10, provided upon the plates 5 and adapted to engage the edges of said valve. The latter is attached to one end of an operating rod or stem 11, which slides through an opening formed in one side of the body 2. Said rod or stem has its outer end detachably connected, as shown at 12, to one end of a lever 13, which is pivoted, as shown at 14, upon the wagon-body, and has its other end extending forwardly and within convenient reach of the driver of the machine. It will be seen that by shifting said lever the valve 9 may be moved to open and close the notches or recesses 8. By making the connection between the valve-rod 11 and the operating-lever 13 detachable said valve and its rod may be removed from the body 2 when it is desired to use the machine for distributing the manure or fertilizer broadcast.

In order to pulverize the manure or fertilizer and feed the same between the plates 5 or through the recesses 8 therein, I provide above said plates a rotary agitator $14^a$. The latter comprises a transversely-extending shaft 15, which has projecting therethrough at suitable intervals pins or rods 16, which when the shaft is rotated pulverize and agitate the fertilizer. Upon one of the outer ends of the shaft 15 is secured a sprocket-wheel 17, which is connected by a sprocket-chain 18 to a sprocket-wheel 19 upon the hub of one of the rear wheels 3, so that when the wagon or machine is drawn forwardly by one or more draft-animals attached thereto the agitator $14^a$ will be rotated, as will be readily understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A fertilizer-distributer comprising a wheel-supported body having its bottom formed of oppositely and downwardly inclined sections spaced apart at their lower adjacent ends, adjustable plates for regulating the opening between said sections and formed with alining notches or recesses, guides upon said plates, a valve slidable in said guide, a stem projecting through and slidably mounted in said body, a lever for operating said stem to cause said valve to open and close said alining notches or recesses, a shaft journaled in said body above said valve, agitator-fingers upon said shaft, and means for rotating said shaft.

2. A fertilizer-distributer comprising a running-gear mounted upon supporting-wheels and having a body provided with oppositely and downwardly inclined bottom sections having their lower edges spaced apart, slotted plates upon the adjacent lower edges of said lower sections, clamping-bolts passed through said slots and said sections, said plates being formed with alining recesses, guides upon said plates, a valve slidably mounted in said guides and adapted to open and close said alining recesses, a valve-stem attached to said valve and projecting through said body, an operating-lever attached to said stem, a transverse shaft mounted above said valve, agitator-fingers above said shaft, a sprocket-wheel upon one end of said shaft, a sprocket-wheel upon one of said supporting-wheels, and a sprocket-chain connecting said sprocket-wheels, substantially as described.

In testimony whereof I have hereunto set my hand in presence of two subscribing witnesses.

WILLIAM ALISON MITCHELL.

Witnesses:
E. MARCHANT,
A. J. HUTCHINSON.